Dec. 8, 1959  W. WALKINSHAW ET AL  2,916,710
LOADED WAVE-GUIDES FOR LINEAR ACCELERATORS
Filed July 16, 1951  3 Sheets-Sheet 1

WILLIAM WALKINSHAW,
LESLIE BADEN MULLETT,
Inventors

By
Attorney

United States Patent Office 2,916,710
Patented Dec. 8, 1959

2,916,710

LOADED WAVE-GUIDES FOR LINEAR ACCELERATORS

William Walkinshaw, Abingdon, and Leslie B. Mullett, Malvern Wells, England, assignors, by mesne assignments, to the United States of America as represented by the United States Atomic Energy Commission Application July 16, 1951, Serial No. 236,998

1 Claim. (Cl. 333—31)

This invention relates to wave-guides loaded by means of insertions of re-entrancies of metal or of solid dielectric material. Metal-loaded wave-guides have become known as corrugated wave-guides and those containing solid dielectric have become known as dielectric-loaded wave-guides.

The invention also relates to linear accelerators of electrons comprising such loaded wave-guides.

The wave-guide of the present invention comprises a hollow conductor providing the guide wall, and insertions for loading the guide, the wall and the insertions being spaced from each other to leave a channel of ring section between them. The insertions may be in the form of transverse discs or apertured plates.

The invention will now be described by way of example with reference to the accompanying drawings in which.

Figure 1:
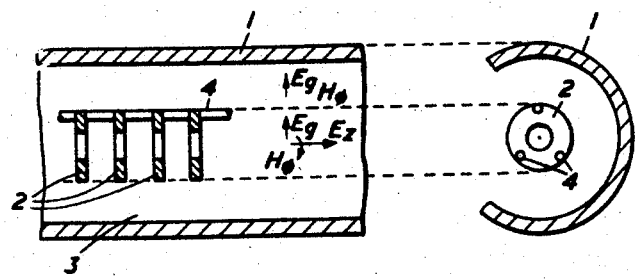
Fig. 1 shows a wave-guide in accordance with one embodiment of the invention in central longitudinal section and in fragmentary cross-section.

As shown in Fig. 1, the waveguide comprises a metal cylinder 1 containing metal washers 2 of diameter substantially smaller than the internal diameter of the cylinder, so that there is an annular cavity between the cylinder and the discs. For a phase velocity equal to that of light, the field distribution in the annular cavity 3 will be exactly the same as in a concentric transmission line, i.e. there are only transverse components $E_\rho$ and $H_\phi$. Hence if the design of the normal corrugated guide is fixed so as to give a phase velocity equal to that of light, the phase velocity and field distribution within the metal discs will be unaffected by expanding the outer envelope. The ohmic loss in the metal envelope is proportional to $\rho H_\phi^2$ where $\rho$ is its radius and $H_\phi$ the magnetic field of the surface.

$$H_\phi \alpha \frac{1}{\rho}$$

and hence the loss is proportional to $$\frac{1}{\rho}$$

The loss therefore decreases with increasing guide radius. In the normal corrugated wave-guide with 5 corrugations per guide wavelength the copper losses are about equally divided between the discs and the outer tube. We can therefore obtain almost a factor of two improvement in shunt impedance when the outer wall is well removed from the discs. The field at the centre hole will be reduced because of the flow of power in the outer channel, consequently the attenuation length will increase. It is therefore necessary in most cases to introduce feed back to make full use of this effect.

The metal discs must of course be supported in some way. They are shown as supported by a small number of longitudinal metal rods 4 attached at the outside edge of the discs. Alternatively a perforated or mesh metal tube, the aggregate area of the openings being large, may be used. Quite apart from the improvement in shunt impedance, the provision of an outer channel is a great improvement from the constructional point of view. The large number of soldered joints in the normal construction with the possibility of considerable extra ohmic loss is completely eliminated. It is also possible to make adjustments to the phase velocity by adjustment of the discs, a procedure which is impracticable after a normally constructed wave-guide has been made up.

Figure 2:
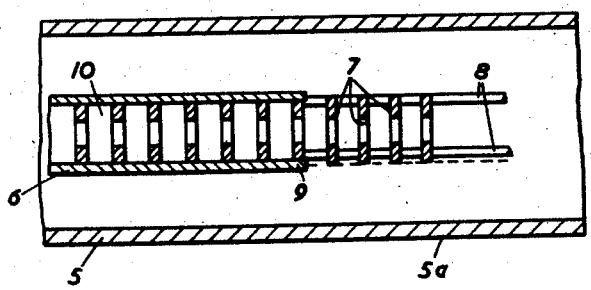
Fig. 2 shows the guide of Fig. 1 in central longitudinal section and provided with an embodiment of feed means in accordance with the invention and Figs. 3 and 4 each show a series of curves in further illustration of the invention.

As shown in Fig. 2, the correct distribution of fields can be attained readily by means of a feeder in the form of a length of conventional corrugated wave-guide 10 enclosed in a co-axial conductor 5 so that the guide cylinder 6 forms a conventional co-axial line with the outer conductor 5, the power flow in the wave-guide 10 and the co-axial line 5, 6 being arranged to be as in the succeeding modified wave-guide comprising outer conductor 5a, discs 7 and support rods 8. The cylinder 6 terminates abruptly at 9.

Similar considerations apply to dielectric-loaded wave-guides. Accordingly an improved dielectric-loaded wave-guide embodying the invention may be constructed in the way represented in Fig. 1 or Fig. 2, the washers 2 and those of the feeder guide 10 being of a dielectric composition.

Figure 3:
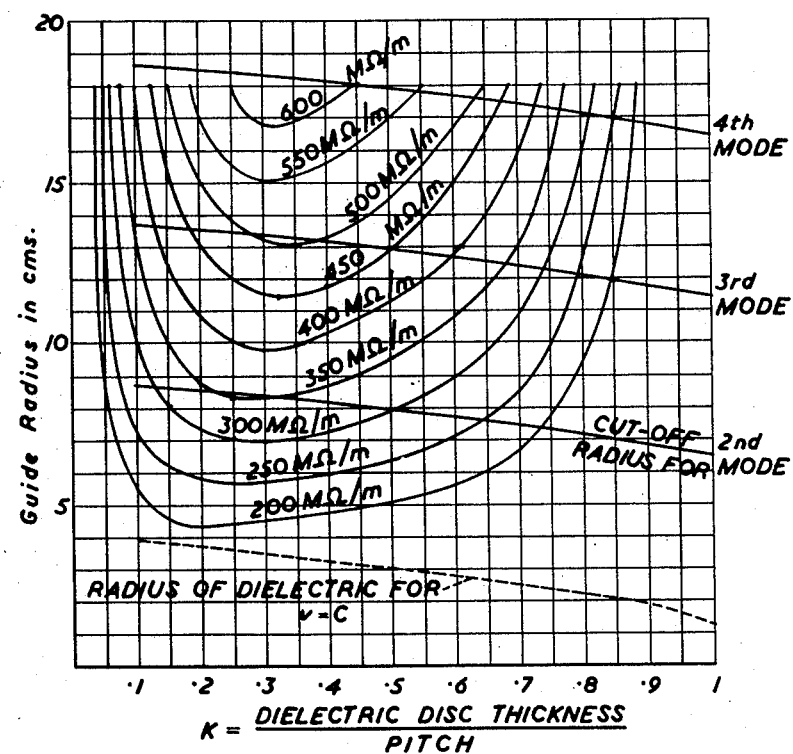

Fig. 3 shows a series of constant efficiency curves as a function of disc spacing and outer wall radius when dielectric discs having a dielectric constant of 95 and a Q of $10^4$ are used. As the width of the outer channel is increased, higher order modes are propagated and the cut-off radii for these modes are also shown. The radius of the holes in the discs is in all cases 1 cm. and the operating wavelength is 10 cm.

The efficiency is expressed in terms of the shunt impedance (megohms/metre) defined as the ratio of the peak accelerating field at the centre of the guide to the power loss per unit length of the guide.

Figure 4:
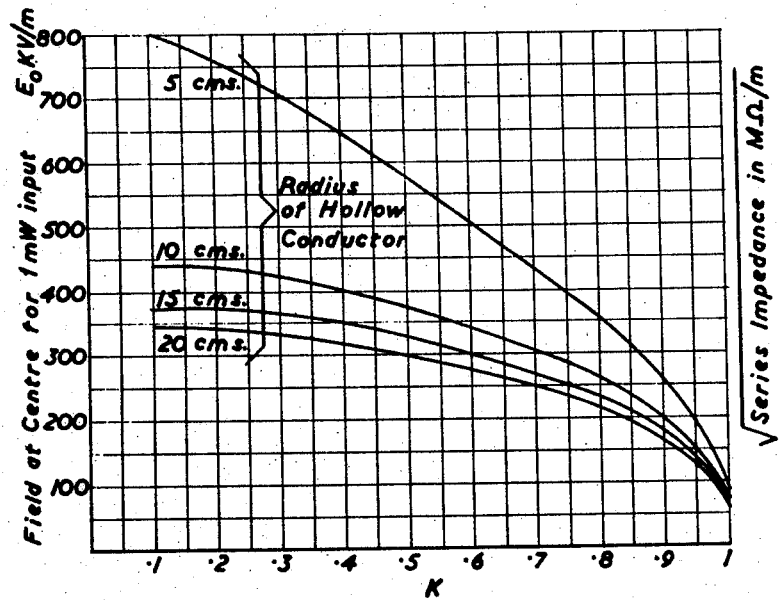

As the shunt impedance increases, however, the series impedance is also required to increase. In the present invention most of the power flow takes place in the outer channel, giving a small series impedance as shown in Fig. 4 for a guide having the same hole radius and operating at the same wavelength as Fig. 3.

For example, in a conventional dielectric loaded guide with a hole radius of 1 cm. and K (disc thickness/pitch) 0.3 and disc radius of 3.4 cm., the maximum efficiency is 162 megohms/metre at a wavelength of 10 cm. By removing the metal wall to a radius of 4.6 cm. the efficiency is increased to 210 megohms/metre but the accelerating field at the centre falls from 3.16 mv./m. to approximately 0.79 mv./m. and the attenuation length increases from 39 metres to 800 metres. Thus for a feedback ratio of 3, the section length is 100 metres.

As applied to linear accelerators of electrons the practical efficiency depends, however, on other factors. The shunt impedance requires to be multiplied by $\cos^2\phi$ where $\phi$ is the phase angle of the electron bunch from the peak of the wave. Also, losses in the feedback system must be allowed for but for reasonably small ratios the efficiency factors of the feedback system is of the same order as the attenuation length. However, the invention enables the efficiency of a dielectric loaded electron accelerator to be increased by a factor of 1.3 for section lengths of about 100 metres.

The invention is also applicable to wave-guides other than circular; the wave-guide may for example have two flat parallel sides. It has particular advantage in waveguides embodied in linear accelerators of electrons.

We claim:

A periodically loaded waveguide providing an axial field for the acceleration of electrons comprising a plurality of circular irises equally spaced apart coaxially in parallel planes so as to define at the operating frequency a series of near-resonant cylindrical chambers opening out of a central channel in which the phase velocity is equal to the velocity of light, a hollow cylindrical conductor coaxially enclosing said irises but spaced therefrom to provide an annular channel for the flow of R.F. power and feed means comprising a corrugated circular waveguide of substantially the same diameter as said irises extending centrally into said hollow cylindrical conductor.

References Cited in the file of this patent

UNITED STATES PATENTS

| | | |
|---|---|---|
| 2,088,749 | King | Aug. 3, 1937 |
| 2,122,538 | Potter | July 5, 1938 |
| 2,338,441 | Kohl | Jan. 4, 1944 |
| 2,395,560 | Llewellyn | Feb. 26, 1946 |
| 2,479,687 | Linder | Aug. 23, 1949 |
| 2,559,581 | Bailey | July 10, 1951 |
| 2,588,610 | Boothroyd et al. | Mar. 11, 1952 |
| 2,595,078 | Iams | Apr. 29, 1952 |
| 2,659,817 | Cutler | Nov. 17, 1953 |

FOREIGN PATENTS

| | | |
|---|---|---|
| 934,220 | France | Jan. 7, 1948 |